(12) United States Patent
Izawa

(10) Patent No.: US 6,639,887 B1
(45) Date of Patent: Oct. 28, 2003

(54) OPTICAL APPARATUS WITH LASER LIGHT RECEIVER AND FOCUS ERROR GENERATOR IN THE SAME LAYER

(75) Inventor: Masataka Izawa, Saitama-ken (JP)

(73) Assignee: Pioneer Corporation, Tokyo-To (JP)

( * ) Notice: Subject to any disclaimer, the term of this patent is extended or adjusted under 35 U.S.C. 154(b) by 0 days.

(21) Appl. No.: 09/492,346

(22) Filed: Jan. 27, 2000

(30) Foreign Application Priority Data

Jan. 27, 1999 (JP) .......................................... P11-018417

(51) Int. Cl.[7] ................................................. G11B 7/12
(52) U.S. Cl. ............................ 369/112.09; 369/112.07; 369/112.14; 369/112.27
(58) Field of Search ........................ 369/44.12, 112.27, 369/112.07, 112.09, 112.14

(56) References Cited

U.S. PATENT DOCUMENTS

| | | | | |
|---|---|---|---|---|
| 4,945,525 A | * | 7/1990 | Yamamoto et al. | 369/44.12 |
| 4,945,527 A | * | 7/1990 | Sunagawa | 369/44.11 |
| 5,164,930 A | * | 11/1992 | Sugiura | 369/44.12 |
| 5,481,516 A | * | 1/1996 | Kim | 369/44.12 |
| 5,583,843 A | * | 12/1996 | Horinouchi | 369/103 |
| 5,757,755 A | * | 5/1998 | Nagano | 369/103 |
| 5,835,472 A | * | 11/1998 | Horie et al. | 369/110 |
| 6,314,063 B1 | * | 11/2001 | Nemoto | 369/44.12 |

* cited by examiner

Primary Examiner—Doris H. To
Assistant Examiner—Gautam R. Patel
(74) Attorney, Agent, or Firm—Young & Thompson

(57) ABSTRACT

An optical integrated apparatus is used in an optical pickup apparatus which irradiates a light emitted by a light emitting device to an optical information record medium, on which record information is recorded, and receives a reflection light reflected from the optical information record medium. The optical integrated apparatus is provided with: a substrate; a light wave coupler for respectively generating a transmitted light and a guided light out of the reflection light; a light guide path for propagating the guided light; a first light receiving portion for receiving the transmitted light; and a second light receiving portion for receiving a radiant light which is generated out of the guided light and is directed toward the substrate due to a phase matching from the light guide path. The light wave coupler, the light guide path, the first light receiving portion and the second light receiving portion are laminated on the substrate. The first light receiving portion and the second light receiving portion are formed in a same layer on the substrate.

9 Claims, 10 Drawing Sheets

OPTICAL APPARATUS WITH LASER LIGHT RECEIVER AND FOCUS ERROR GENERATOR IN THE SAME LAYER

BACKGROUND OF THE INVENTION

1. Field of the Invention

The present invention relates to an optical integrated apparatus or device used in an optical pickup apparatus for optically reproducing information recorded on a record medium, such as a CD (Compact Disc), a LVD (Laser Vision Disc) and the like, or optically recording the information onto the record medium.

2. Description of the Related Art

As disclosed in Japanese Patent Application Laid Open No.Hei-4-89634, as one type of the above-mentioned optical pickup apparatus, there is an apparatus which has a semiconductor laser as a light emitting device on a semiconductor substrate on which a phase film layer, a polarization film layer, a diffraction grating, a light guide path and a first light receiving portion are laminated, and that further has a second light receiving portion at an end of the light guide path.

In this optical pickup apparatus, when the laser light is irradiated from the semiconductor laser to the phase film layer at a predetermined depression angle, the laser light is transmitted through this phase film layer, is reflected on a surface of the polarization film layer, and is collected and projected onto an information surface of an optical disc. Then, the laser lights, which are diffracted and reflected on the information surface of the optical disc, are transmitted through the phase film layer and the polarization film layer, and are inputted to the diffraction grating. Most of the reflected laser lights become the transmitted lights which are transmitted through this diffraction grating and are sent below the substrate. The remainders thereof become the guided lights guided or propagated through the light guide path. The transmitted lights are received by the first light receiving portion. A tracking error signal, an RF (Radio Frequency) signal and the like are generated by this first light receiving portion. Also, the guided lights are received by the second light receiving portion formed at the end of the light guide path. A focus error signal is generated by this second light receiving portion.

According to this optical pickup apparatus, respective constitutional elements are integrated in a process of manufacturing the semiconductor substrate, which enables the whole apparatus to be compact, and also enables the improvement of an effective utilization efficiency of the light quantity.

However, in the above-mentioned conventional optical pickup apparatus, the second light receiving portion for generating the focus error signal has such a special positional relation that it is equipped vertically with respect to the light guide path and the first light receiving portion for generating the RF signal. This results in a problem that a general light receiving device cannot be used for the second light receiving portion.

As a result, in order to manufacture this optical pickup apparatus, it is necessary to newly manufacture the light receiving portion itself as a second light receiving portion. Moreover, the manufacturing process is relatively complex because of the above mentioned special positional relation as for the second light receiving portion. Thus, this also results in a problem of the increase of the manufacturing cost of the optical pickup apparatus.

SUMMARY OF THE INVENTION

It is therefore an object of the present invention to provide an optical integrated apparatus for an optical pickup apparatus, which can achieve an integration by using a process of manufacturing a semiconductor substrate to thereby make the whole apparatus compact and improve the utilization efficiency of the light quantity, and can effectively utilize the existing manufacturing apparatus or method to thereby allow its easy manufacture and reduce its manufacturing cost.

The above object of the present invention can be achieved by a first optical integrated apparatus used in an optical pickup apparatus which irradiates a light emitted by a light emitting device to an optical information record medium, on which record information is recorded, and receives a reflection light reflected from the optical information record medium. The first optical integrated apparatus is provided with: a substrate; a light wave coupler for respectively generating a transmitted light and a guided light out of the reflection light; a light guide path for propagating the guided light; a first light receiving portion for receiving the transmitted light; and a second light receiving portion for receiving a radiant light which is generated out of the guided light and is directed toward the substrate due to a phase matching from the light guide path. The light wave coupler, the light guide path, the fist light receiving portion and the second light receiving portion are laminated on the substrate. The first light receiving portion and the second light receiving portion are formed in a same layer on the substrate.

According to the first optical integrated apparatus of the present invention, the light irradiated onto the optical information record medium, which is emitted from the light emitting device, is reflected by the optical information record medium. Then, the reflected light thereof is inputted to the light wave coupler of the optical integrated apparatus. The light wave coupler generates the guided light and the transmitted light out of the reflected light. The transmitted light is received by the first light receiving portion. On the other hand, the guided light is propagated through the light guide path and is irradiated from the light guide path by the phase matching toward the substrate so that the second light receiving portion receives it as the irradiated light. In this manner, the reflected light from the optical information record medium passes through the light wave coupler, the light guide path and the first or second light receiving portion. Since the light wave coupler, the light guide path and the first light receiving portion as well as the second light receiving portion are laminated on the substrate and since the first light receiving portion and the second light receiving portion are in the same layer, the first optical integrated apparatus can be easily manufactured by a planar technique such as a semiconductor manufacturing technique or an IC (Integrated Circuit) manufacturing process, and the manufacturing cost can be reduced. Also, the first optical integrated apparatus can be miniaturized while improving the light effective utilization efficiency.

In one aspect of the first optical integrated apparatus of the present invention, the first light receiving portion generates signals respectively corresponding to the record information and in-plane position information of the emitted light with respect to the optical information record medium, and the second light receiving portion generates a signal corresponding to focal point information of the emitted light on the optical information record medium.

According to this aspect, among the reflected light from the optical information record medium, the transmitted light generated by the light wave coupler is received by the first light receiving portion. The signal to read the record information and the signal to read the in-plane position information can be generated on the basis of the output of the first light receiving portion. On the other hand, among the reflected light from the optical information record medium, the guided light generated by the light wave coupler is propagated through the light guide path and is received by the second light receiving portion as the irradiated light toward the substrate from the light guide path by phase matching. Then, on the basis of the output of the second light receiving portion, the signal to read the focal position information is generated. As mentioned above, since the signal to read the record information and the signal to read the in-plane position information can be generated on the basis of the transmitted light having the enough intensity, those signals can be generated as having good qualities. Further, since the signal to read the focal position information of the irradiated light with respect to the optical information record medium can be generated by the guided light, which is propagated through the light guide path and which can reserve an enough light propagation length, a subtle change of the irradiated light on the optical information record medium can be detected as a large optical change at the second light receiving portion. Namely, the signal to read the focal position information can be generated as having good signal quality.

The above object of the present invention can be also achieved by a second optical integrated apparatus used in an optical pickup apparatus which irradiates a light emitted by a light emitting device to an optical information record medium, on which record information is recorded, and receives a reflection light reflected from the optical information record medium. The second optical integrated apparatus is provided with: a substrate; a light wave coupler for respectively generating a transmitted light and a guided light out of the reflection light; a light guide path for propagating the guided light; a first light receiving portion for receiving the transmitted light; and a second light receiving portion for receiving a radiant light which is generated out of the guided light and is directed toward the substrate due to a phase matching from the light guide path. The light wave coupler, the light guide path, the fist light receiving portion and the second light receiving portion being laminated on the substrate. The first light receiving portion and the second light receiving portion being disposed independently from each other on the substrate. The first light receiving portion generating signals respectively corresponding to the record information and in-plane position information of the emitted light with respect to the optical information record medium. The second light receiving portion generating a signal corresponding to focal point information of the emitted light on the optical information record medium.

According to the second optical integrated apparatus of the present invention, the light irradiated onto the optical information record medium, which is emitted from the light emitting device, is reflected by the optical information record medium. Then, the reflected light thereof is inputted to the light wave coupler of the optical integrated apparatus. The light wave coupler generates the guided light and the transmitted light out of the reflected light. The transmitted light is received by the first light receiving portion. On the other hand, the guided light is propagated through the light guide path and is irradiated from the light guide path by the phase matching toward the substrate so that the second light receiving portion receives it as the irradiated light. In this manner, the reflected light from the optical information record medium passes through the light wave coupler, the light guide path and the first or second light receiving portion. Since the light wave coupler, the light guide path and the first light receiving portion as well as the second light receiving portion are laminated on the substrate, the first optical integrated apparatus can be easily manufactured by a planar technique such as a semiconductor manufacturing technique or an IC (Integrated Circuit) manufacturing process, and the manufacturing cost can be reduced. Also, since the first light receiving portion and the second light receiving portion are disposed independent from each other, the signal to read the record information of the optical information record medium and the signal to read the in-plane position information can be generated on the basis of the transmitted light having enough intensity. Namely, those signal can be generated as having good signal qualities. Further, since the signal to read the focal position information of the irradiated light with respect to the optical information record medium can be generated by the guided light, which is propagated through the light guide path and which can reserve an enough light propagation length, a subtle change of the irradiated light on the optical information record medium can be detected as a large optical change at the second light receiving portion. Namely, the signal to read the focal position information can be generated as having good signal quality.

In one aspect of the second optical integrated apparatus of the present invention, the first light receiving portion and the second light receiving portion are formed in a same layer on the substrate.

According to this aspect, since the first light receiving portion and the second light receiving portion are in the same layer, the first optical integrated apparatus can be easily manufactured by a planar technique, and the manufacturing cost can be reduced.

In another aspect of the first or second optical integrated apparatus of the present invention, the substrate comprises a semiconductor substrate.

According to this aspect, the first or second optical integrated apparatus can be easily manufactured by a planar technique such as a semiconductor manufacturing technique or an IC (Integrated Circuit) manufacturing process, and the manufacturing cost can be reduced.

In another aspect of the first or second optical integrated apparatus of the present invention, the first light receiving portion is mounted at one position directly beneath the light wave coupler in a lamination direction of the optical integrated apparatus or at another position in a vicinity of the one position.

According to this aspect, among the reflected light from the optical information record medium, the transmitted light generated by the light wave coupler is received by the first light receiving portion. Since the first light receiving portion is mounted at one position directly beneath the light wave coupler in a lamination direction of the optical integrated apparatus or at another position in a vicinity of the one position, the first light receiving portion can receive the transmitted light which transmits the light wave coupler and has a strong intensity. Therefore, the signal can be generated as having the good signal quality on the basis of the output of the first light receiving portion. Further, it becomes possible to dispose the first light receiving portion at a position of the far-field with respect to the light emitting device, so that a stable signal generation can be performed while reducing the influence of the positional displacement or shift of the light emitting device.

In another aspect of the first or second optical integrated apparatus of the present invention, the second light receiving portion is mounted on a front side, in a propagation direction of the guided light, of a position of the light wave coupler, the optical integrated apparatus further comprises an insulation buffer layer disposed between a layer of the second light receiving portion and a layer of the light guide path, the buffer layer has an inclined surface to reduce a layer thickness of the buffer layer from a predetermined position on a side of the light wave coupler to a position above the second light receiving portion.

According to this object, among the reflected light from the optical information record medium, the guided light generated by the light wave coupler is propagated through the light guide path and reaches the position of the second light receiving portion, which is mounted on a front side, in a propagation direction of the guided light, of a position of the light wave coupler. At this time, the insulation buffer layer is disposed between a layer of the second light receiving portion and a layer of the light guide path. The buffer layer has an inclined surface to reduce a layer thickness of the buffer layer from a predetermined position on a side of the light wave coupler to a position above the second light receiving portion. Therefore, the layer thickness of the buffer layer above the second light receiving portion is thinner than that of the other portions thereof, so that the guide light propagated through the light guide path is irradiated from the light guide path certainly with enough power, to be received by the second light receiving portion. In this manner, since the light is propagated by the light guide path which can reserve an enough light propagation length and since the light, which is irradiated certainly with enough irradiation power, is inputted to the second light receiving portion with enough light intensity, it is possible to perform the generation of the signal with high sensitivity and high quality.

In another aspect of the first or second optical integrated apparatus of the present invention, the first or second optical integrated apparatus is further provided with a light path separation layer disposed at a top layer of the optical integrated apparatus for separating a light path of a light incident to the top layer into one path for the reflected light to an outside portion of the optical integrated apparatus and another path for the transmitted light to an internal portion of the optical integrated apparatus. The light separation layer comprising a multiple-layered film of dielectric material.

According to this aspect, the light emitted from the light emitting device is inputted to the light separation layer formed at the top layer of the first or second optical integrated apparatus. The light separation layer reflects the incident light to thereby generate the irradiation light toward the information record surface of the optical information record medium. On the other hand, the light returned from the optical information record medium is inputted to the light separation layer through the same path for the irradiated light toward the optical information record medium. Then, the light separation layer transmits this returned light to the internal portion of the first or second optical integrated apparatus. The light separation layer comprising a multiple-layered film of dielectric material, changes the phase of the light emitted from the light emitting device by appropriate degrees, and transmits the light having an appropriate mode to the internal portion of the first or second optical integrated apparatus. Therefore, it is possible to appropriately perform the light receiving operation by each light receiving portion as described above.

In another aspect of the first or second optical integrated apparatus of the present invention, the first or second optical integrated apparatus is further provided with a light path separation layer disposed at a top layer of the optical integrated apparatus for separating a light path of a light incident to the top layer into one path for the reflected light to an outside portion of the optical integrated apparatus and another path for the transmitted light to an internal portion of the optical integrated apparatus. The light separation layer is provided with: a second light wave coupler for generating a guided light out of the incident light; a second light guide path for propagating the guided light generated by the second light wave coupler; and a third light wave coupler for irradiating the guided light propagated through the second light guide path to the outside portion of the optical integrated apparatus.

According to this aspect, the light emitted from the light emitting device is inputted to the second light wave coupler formed at the top layer of the first or second optical integrated apparatus. The second light wave coupler generates the guided light out of the incident light, and this guided light is propagated through the second light guide path. Then, this guided light propagated through the second light guide path reaches the third light wave coupler, is irradiated to the outside portion of the first or second optical integrated apparatus by the third light wave coupler, is passed through a ¼ wave length plate, and is irradiated onto the information record surface of the optical information record medium. On the other hand, the light returned from the optical information record medium is inputted to the third light wave coupler through the same path for the irradiated light toward the optical information record medium. Then, the third light wave coupler transmits this returned light to the internal portion of the first or second optical integrated apparatus. A grating coupler, which is provided with the above described second and third light wave couplers and the second light guide path, propagates and reflects the light at a predetermined mode (e.g., TM mode or TE mode) while transmitting the light at a predetermined mode to the internal portion of the first or second optical integrated apparatus. Therefore, it is possible to appropriately perform the light receiving operation by each light receiving portion as described above.

In another aspect of the first or second optical integrated apparatus of the present invention, the second light receiving portion has a light receiving surface, which is formed substantially parallel to an optical axis of the guided light propagated through the light guide path, the second light receiving portion generates a signal corresponding to focal point information of the emitted light on the optical information record medium by detecting a change of an image area of the irradiated light from the light guide path on the light receiving surface based on a change of a focal position of the irradiated light.

According to this aspect, among the reflected light from the optical information record medium, the guided light generated by the light wave coupler is propagated through the light guide path and is received by the second light receiving portion as the irradiated light from the light guide path. The light receiving surface of the second light receiving portion is formed substantially parallel to an optical axis of the guided light propagated through the light guide path. Thus, if the focal position of the irradiated light from the light guide path is changed, it can be detected as the change of the image area on the light receiving surface. Namely, the change of the focal position of the irradiated light with respect to the optical information record medium can be easily and certainly detected as the change of the image area formed on this light receiving surface. Also, the adjustment of the received light at the second light receiving portion can be easily performed by changing the distance between the light guide path and this light receiving surface or by changing the size of this light receiving surface in the optical axis direction.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 8A(ii) is a plan view of a beam spot formed on the light receiving portion 22 in the situation corresponding to FIG. 8A(i);

FIG. 8B(ii) is a plan view of a beam spot formed on the light receiving portion 22 in the situation corresponding to FIG. 8B(i);

FIG. 8C(ii) is a plan view of a beam spot formed on the light receiving portion 22 in the situation corresponding to FIG. 8C(i);

DETAILED DESCRIPTION OF THE PREFERRED EMBODIMENTS

Preferred embodiments of the present invention will be described with reference to the attached drawings.

At first, an optical pickup apparatus in the embodiment is schematically described.

Schema of Optical Pickup Apparatus

Figure 1:
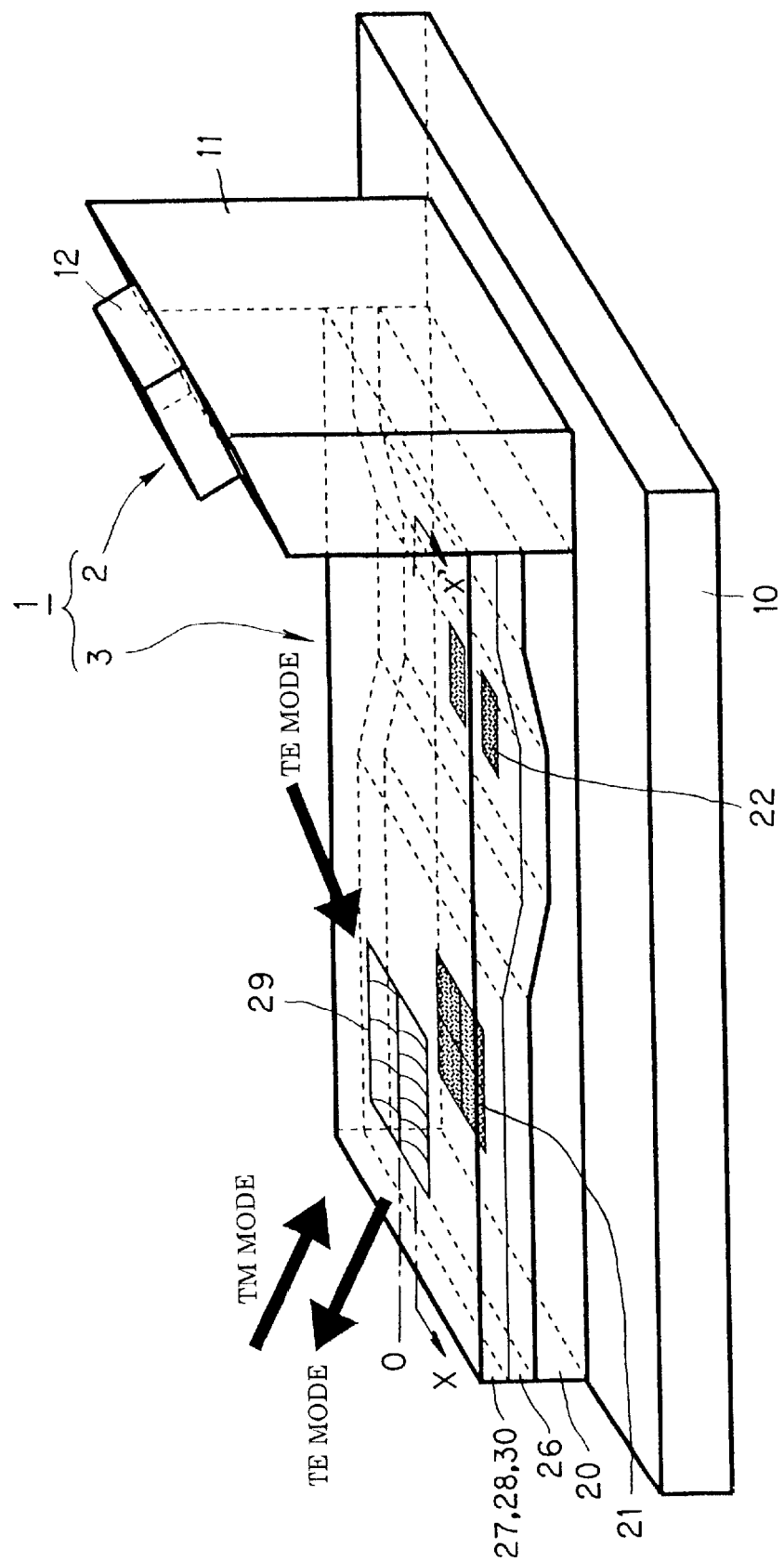
FIG. 1 is a perspective view showing a schematic configuration of an optical pickup apparatus as a first embodiment of the present invention.

FIG. 1 is a perspective view showing the schematic configuration of an optical pickup apparatus 1 in one embodiment of the present invention.

In FIG. 1, an optical pickup apparatus 1 is provided with: a semiconductor laser portion 2 having a semiconductor laser 12 serving as a light emitting device; and an optical integrated apparatus 3 laminated on a semiconductor substrate 20. The semiconductor substrate 20 and a sub-mount 11 are bonded on a mount base 10. The semiconductor laser 12 is designed so as to emit a laser light at a predetermined angle onto a top surface of the optical integrated apparatus 3.

Figure 2:
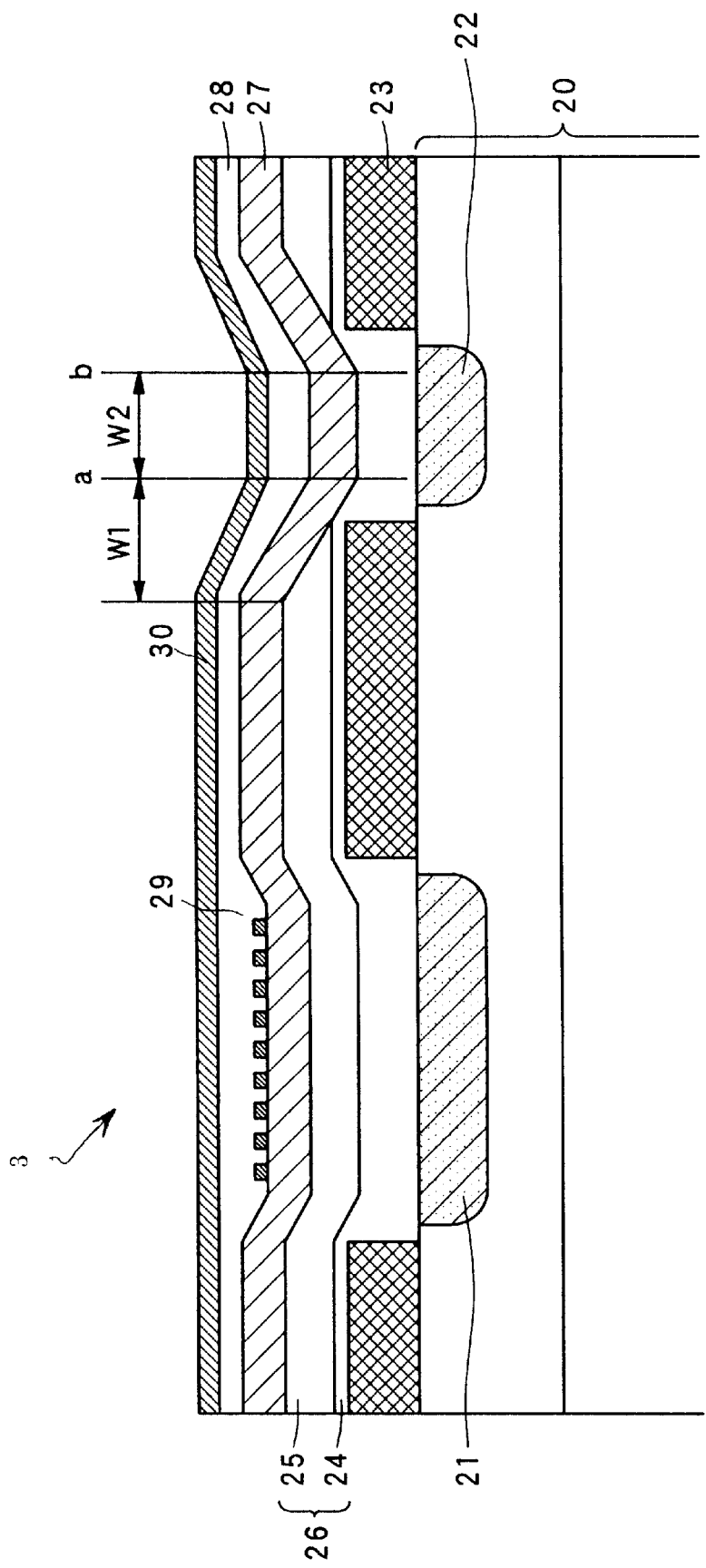
FIG. 2 is an X–X' sectional view of FIG. 1.

As shown in FIG. 2, which is an X–X' sectional view of FIG. 1, the optical integrated apparatus 3 is configured as following. Namely, an aluminum light shield film 23, an SOG (Spin On Glass) layer 24 mounted to smooth the stage differences caused by the aluminum light shield film 23, an $SiO_2$ buffer layer 25 mounted on the SOG layer 24, a light guide path 27 which is mounted on the $SiO_2$ buffer layer 25 and through which the laser light is transmitted and also propagated (or guided) as a guided light, a grating 29 which is formed on the light guide path 27 and serves as a light wave coupler for separating the laser lights into the transmitted lights and the guided lights, an SOG layer 28 mounted on the grating 29, and an outward and return path separation film 30 mounted on the SOG layer 28 are laminated on the semiconductor substrate 20, in which a first light receiving portion 21 and a second light receiving portion 22 are formed.

The outward and return path separation film 30 which is a top layer is provided with a multiple-layered film such as dielectric and the like. As an example, it is constituted so as to reflect the laser lights at a TE mode outputted by the semiconductor laser 1 and also transmit the return lights at the TM mode from the optical disc which is passed through a ¼ wave length plate.

The grating 29 is made of $TiO_2$ having a thickness of about 0.10 μm and constitutes a grating coupler together with the light guide path 27. The grating coupler transmits downward most of the laser lights at the TM mode transmitted through the outward and return path separation film 30, and also causes the part thereof to be propagated through the light guide path 27 as the guided light. In this way, the grating coupler in this embodiment has such a configuration that the return lights from the optical disc are inputted and coupled to the light guide path 27. Thus, a grating pitch is set to be equal to or less than a wave length of the used laser light. Also, the grating 29 in this embodiment is halved to right and left sides with a central line O along a propagation direction of the guided light through the light guide path 27 as a boundary, as shown in FIG. 1. Patterns of the grating 29 are designed such that the right and left sides thereof are different from each other. The right and left patterns of the grating 29 are both curved, and are at so-called chirping states in which the pitches of the gratings are different depending on locations.

The light guide path 27 is made of CORNING 7059 (Trade Name) having a thickness of about 0.65 μm, and its refractive index is 1.53. Also, the SOG layer 28 having a refractive index of about 1.43 and a thickness of about 0.40 μm is mounted on a top layer side of the light guide path 27. A buffer layer 26, which is composed of the SOG layer 24 having a refractive index of about 1.43 and a thickness of about 0.40 μm and the SiO$_2$ layer 25 having a refractive index of about 1.47 and a thickness of about 0.70 μm, is mounted on a bottom layer side of the light guide path 27. In this way, the light guide path 27 satisfies a predetermined wave guide condition since its refractive index is set to be higher than the peripheral layers thereof and is further formed at a predetermined thickness. So, the guided lights which are inputted and coupled through the grating 29 are propagated at a guide mode. Also, in a periphery of a boundary between the second light receiving portion 22 and the aluminum light shield film 23, there is a slope that the buffer layer 26 goes down from the side of the aluminum light shield film 23 toward the side of the second light receiving portion 22, in an area of a length W1 as shown in FIG. 2. The buffer layer 26 above the second light receiving portion 22 is formed so as to be thinner than other portions thereof. Due to such a configuration, the light guide path 27 becomes at an emission mode and emits the guided lights by a phase matching with the substrate, above the second light receiving portion 22.

Figure 3:
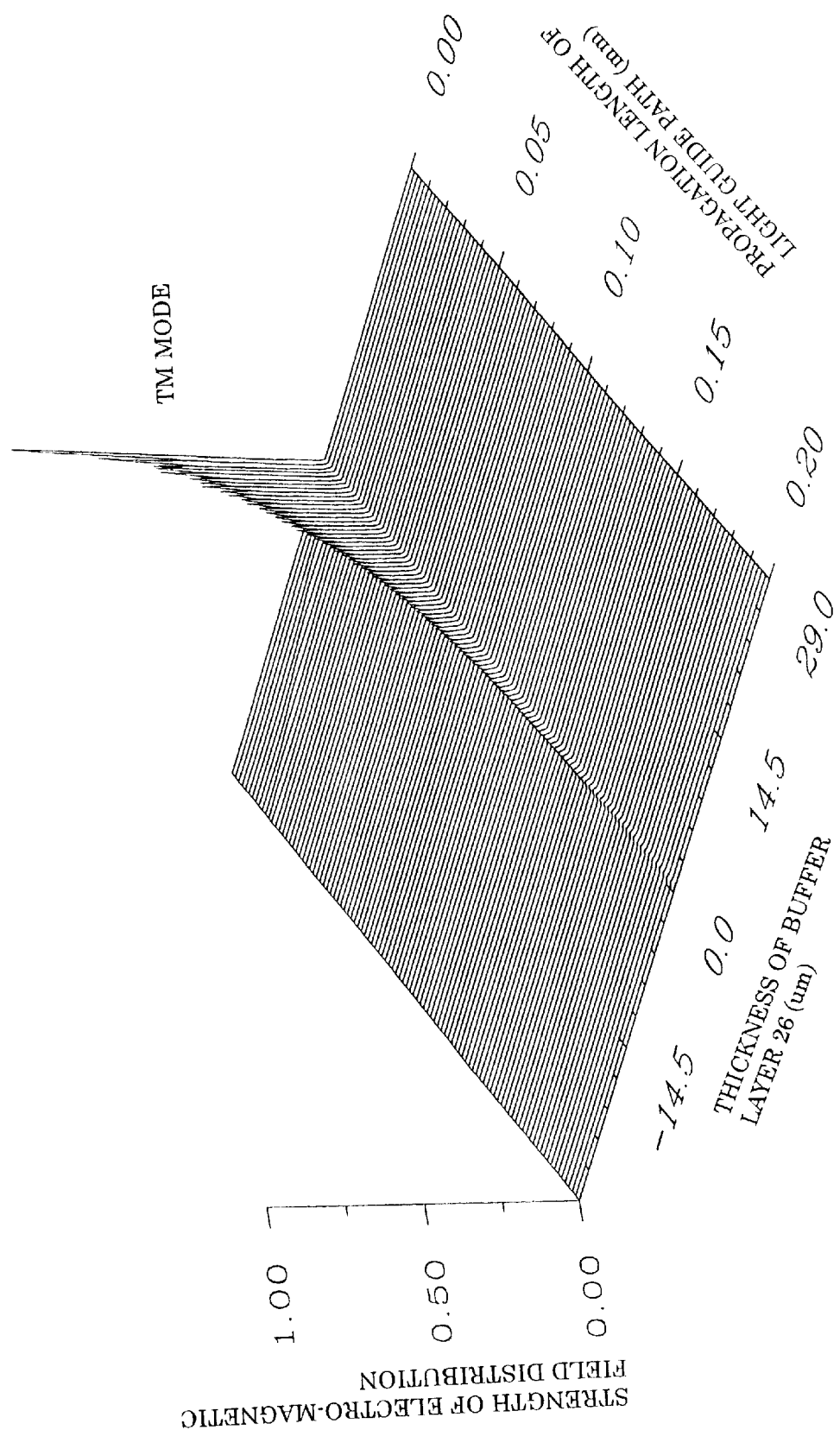
FIG. 3 is a diagram showing an example of a strength change of an electromagnetic field distribution with respect to a propagation length of a laser light at a TM mode.

FIG. 3 shows an example of a strength change of an electro-magnetic field distribution in the laser light at the TM mode in the emission mode. FIG. 3 is a diagram showing the strength in the electro-magnetic field distribution with respect to the propagation length of the light guide path 27, when a length of the second light receiving portion 22 (i.e., a length in a propagation direction parallel to a paper surface in FIG. 2) is assumed to be 200 μm and a thickness of the buffer layer 26 between the second light receiving portion 22 and the light guide path 27 is assumed to be 0.5 μm. Here, the propagation length of the light guide path 27 implies a propagation length in an area of a length W2 shown in FIG. 2, and also indicates a propagation length until an end "b" on an opposite side, with an end "a" on the side of the area W1 as an original point. In FIG. 3, the thickness of the buffer layer 26 is represented by a positive value when the boundary position between the buffer layer 26 and the surface of the second light receiving portion 22 is assumed to be zero, and a position on the side of the semiconductor substrate 20 is represented by a negative value.

As can be understood from FIG. 3, a strength of 1.00 at the position (0.00 mm) of the end "a" is gradually dropped in conjunction with the approach to the side of the end "b". Then, it becomes substantially zero at a position of 0.20 mm. In this embodiment, a length W2 (b-a) is set to 0.2 mm. Thus, it can be understood that substantially all the guided lights are emitted from the light guide path 27 until the completion of the propagation of the guided lights through the area of the length W2.

Also, the thickness of the buffer layer 26 between the second light receiving portion 22 is variously changed to then make an experiment. From the experiment, it is understood that it is necessary to make the thickness of the buffer layer 26 equal to or less than 0.5 μm, in order to emit substantially all the guided lights from the light guide path 27 in the area of the length W2.

In addition, this embodiment is implemented so as to propagate the laser lights at the TM mode as the guided light. The result shown in FIG. 3 and the result of the experiment are obtained by using the laser lights at the TM mode. However, the similar results are obtained from the configuration in which the laser lights at the TE mode are propagated as the guided light.

Figure 4:
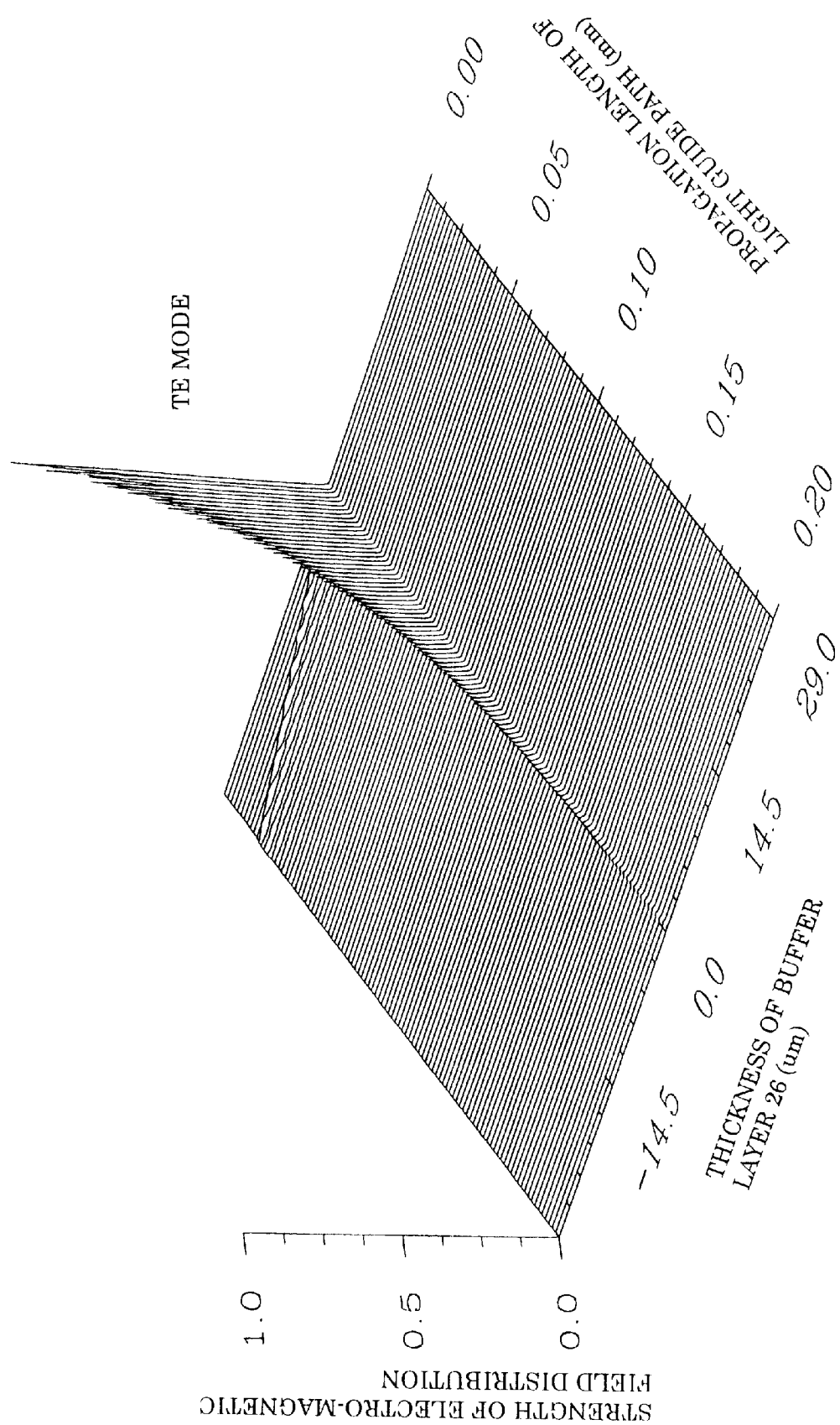
FIG. 4 is a diagram showing an example of the strength change of the electromagnetic field distribution with respect to the propagation length of the laser light at the TE mode.

As an example, FIG. 4 shows the strength of the electromagnetic field distribution with respect to the propagation length of the light guide path 27, when the laser lights at the TE mode are used, the length of the second light receiving portion 22 is assumed to be 200 μm, and the thickness of the buffer layer 26 between the second light receiving portion 22 and the light guide path 27 is assumed to be 0.2 μm. As can be understood from FIG. 4, when the laser lights at the TE mode are used, it is understood that substantially all the guided lights can be emitted from the light guide path 27 until the completion of the propagation of the guided lights through this area of the length W2, since the thickness of the buffer layer 26 is set to 0.2 μm. Also, when the laser lights at the TE mode are used to variously change the thickness of the buffer layer 26 between the second light receiving portion 22 and then make the experiment, it is understood that it is necessary to make the thickness of the buffer layer 26 equal to or less than 0.2 μm, in order to emit substantially all the guided lights from the light guide path 27 in the area of the length W2, in a case of the laser light at the TE mode.

The first light receiving portion 21 is the light receiving portion quartered to generate the RF signal and the tracking error signal, and is mounted directly beneath the grating 29 or slightly away from the position directly beneath the grating 29.

The second light receiving portion 22 is the light receiving portion halved to generate the focus error signal, and is mounted at a position away from the grating 29. Then, a sufficient length of the light path is reserved.

Method of Manufacturing Optical Integrated Apparatus

The method of manufacturing the optical integrated apparatus 2 in this embodiment as mentioned above will be described below.

Figure 5:
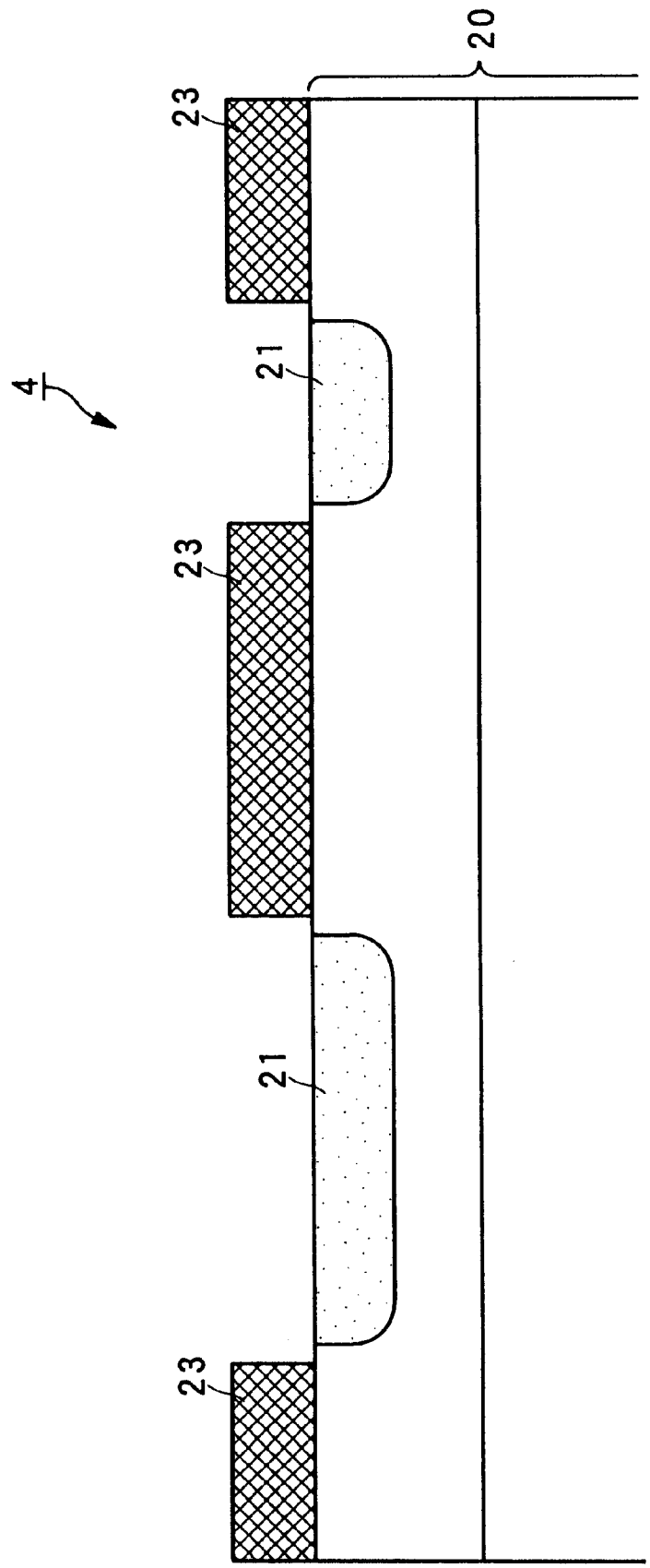
FIG. 5 is a sectional view showing a photo detector used for manufacturing a optical integrated apparatus shown in FIG. 1.

In this embodiment, a photo detector 4 provided with the semiconductor substrate 20 and the aluminum light shield film 23 as shown in FIG. 5 is firstly manufactured in which light receiving surfaces of the first and second light receiving portions 21 and 22 are formed on the same surface of the semiconductor substrate 20. Alternatively, an OEIC (Opto-Electronic-Integrated Circuit (Photo Detector with Amplifier)) may be used instead of the photo detector 4. Such a photo detector 4 or OEIC has the configuration similar to that typically used in a reproducing apparatus such as a LVD (Laser Vision Disc) player, a DVD player and the like. Thus, it can be manufactured only by changing a pattern, and the change of process and the like are not necessary. Hence, it can be manufactured by using the existing apparatus.

Next, the aluminum light shield film 23 or aluminum wiring is formed on the photo detector 4 or OEIC as mentioned above. Since they constitute the stage difference at the light receiving surfaces of the first and second light receiving portions 21 and 22, the buffer layer (e.g., an insulation film) 26 is coated (or film-formed) as shown in FIG. 2, in order to fill this stage difference. The buffer layer 26 has a multiple-layered structure composed of the SOG layer 24 and the SiO$_2$ layer 25 by a sputtering method, for example. The SOG layer 24 is used to reduce the stage difference. The SiO$_2$ layer 25 is used to adjust the distance between the first light receiving portion 21 and the light guide path 27. This adjustment is carried out by optimizing the distance between the first light receiving portion 21 and the light guide path 27. This is because the input couple coefficient of the grating coupler is changed in accordance with the thickness of the buffer layer.

Next, the buffer layer 26 above the second light receiving portion 22 is removed in the areas of the lengths W1 and W2 shown in FIG. 2, and then it is processed into the shape having a very gentle slope. As the processing method, it is enough to use a wet-etching method or the like. The formation of such slope enables the distance between the second light receiving portion 22 and the light guide path 27 to be shorter than the distance between the first light receiving portion 21 and the light guide path 27. Then, if the mode of the guided lights propagated through the light guide path 27 is changed from the guide mode to the emission mode, the propagation lights can be excellently leaked into the second light receiving portion 22. In addition, in order to reduce the propagation loss caused by the slope, it is desirable to make an angle of the slope as gentle as possible.

Next, the film of the light guide path 27 is formed on the above-mentioned buffer layer 26. Moreover, the grating coupler having a function of an optical device is formed on the light guide path 27. The position of the grating 29 is located at a position directly over the first light receiving portion 22 or a position slightly deviated in a direction opposite to the propagation direction. The grating coupler is easy to manufacture in the configuration in which the light quantity of the transmitted lights is larger than that of the guided lights. Such a configuration is employed in this embodiment. Thus, the RF signal that is important in reproducing a signal can be excellently generated by mounting the light receiving portion at the position at which the transmitted lights of the sufficient light quantity can be effectively received as compared with the guided lights. Also, it is similarly possible to excellently generate the tracking error signal.

After the formation of the grating 29, the SOG layer 28 is again embedded. At this time, in order to effectively carry out the input coupling of the embedding grating, it is desirable that the configuration of the refractive index is as follows:

$$n(\text{SOG Layer 28}) \leq n(\text{SiO}_2 \text{ Buffer Layer 25}) < n(\text{Light Guide Path 27}) < n(\text{Grating 29})$$

wherein n(XXX) designates the refractive index of XXX.

The material and the refractive index of each layer are as following, for example.

| LAYER | MATERIAL | REFRACTIVE INDEX |
|---|---|---|
| SOG Buffer Layer 24 | SOG | n = 1.43 |
| SiO$_2$ Buffer Layer 25 | SiO$_2$ | n = 1.47 |
| Light Guide Path 27 | CORNING 7059 | n = 1.53 |
| Grating 29 | TiO$_2$ | n = 2.00 |
| SOG Buffer Layer 28 | SOG | n = 1.43 |

Also, the film thickness of each layer is as following, for example.

| LAYER | FILM THICKNESS |
|---|---|
| SOG Buffer Layer 24: (above the first light receiving portion 21) | 0.40 μm |
| SiO$_2$ Buffer Layer 25 | 0.70 μm |
| Light Guide Path 27 | 0.65 μm |
| Grating 29 | 0.10 μm |
| SOG Buffer Layer 28 | 0.40 μm |

After the completion of the embedding of the SOG layer 28, the surface is polished so that the surface can have excellent surface accuracy. Finally, the outward and return path separation film is deposited.

As mentioned above, since the optical integrated apparatus in this embodiment can use the typical photo detector or OEIC, it can be easily manufactured. Also, the conventional manufacturing apparatus can be employed to thereby reduce its manufacturing cost.

Operation of Optical Pickup Apparatus 1

Figure 6:
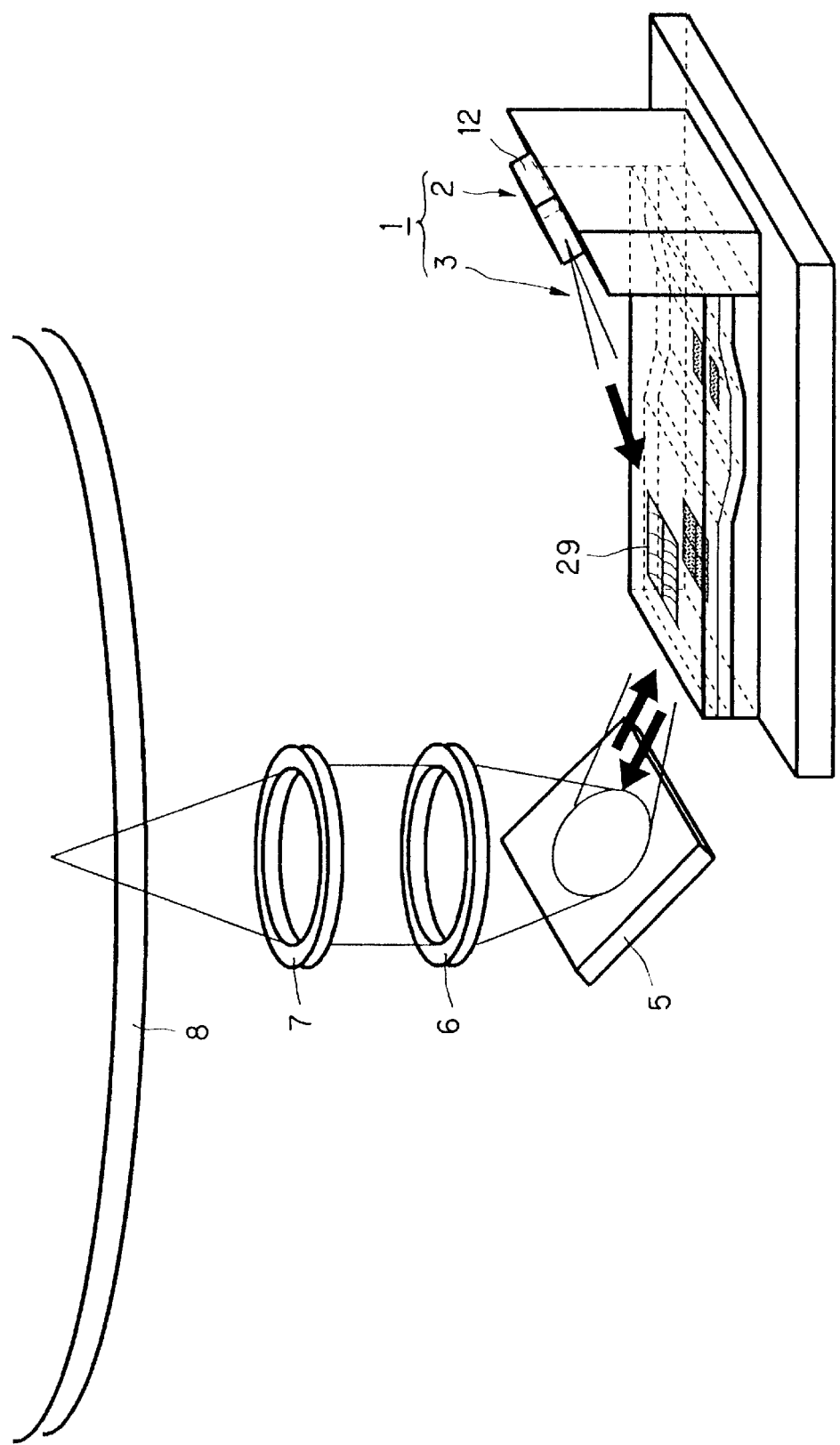
FIG. 6 is a perspective view showing a whole configuration of an optical system including a disc using the optical pickup apparatus in the first embodiment.
Figure 7:
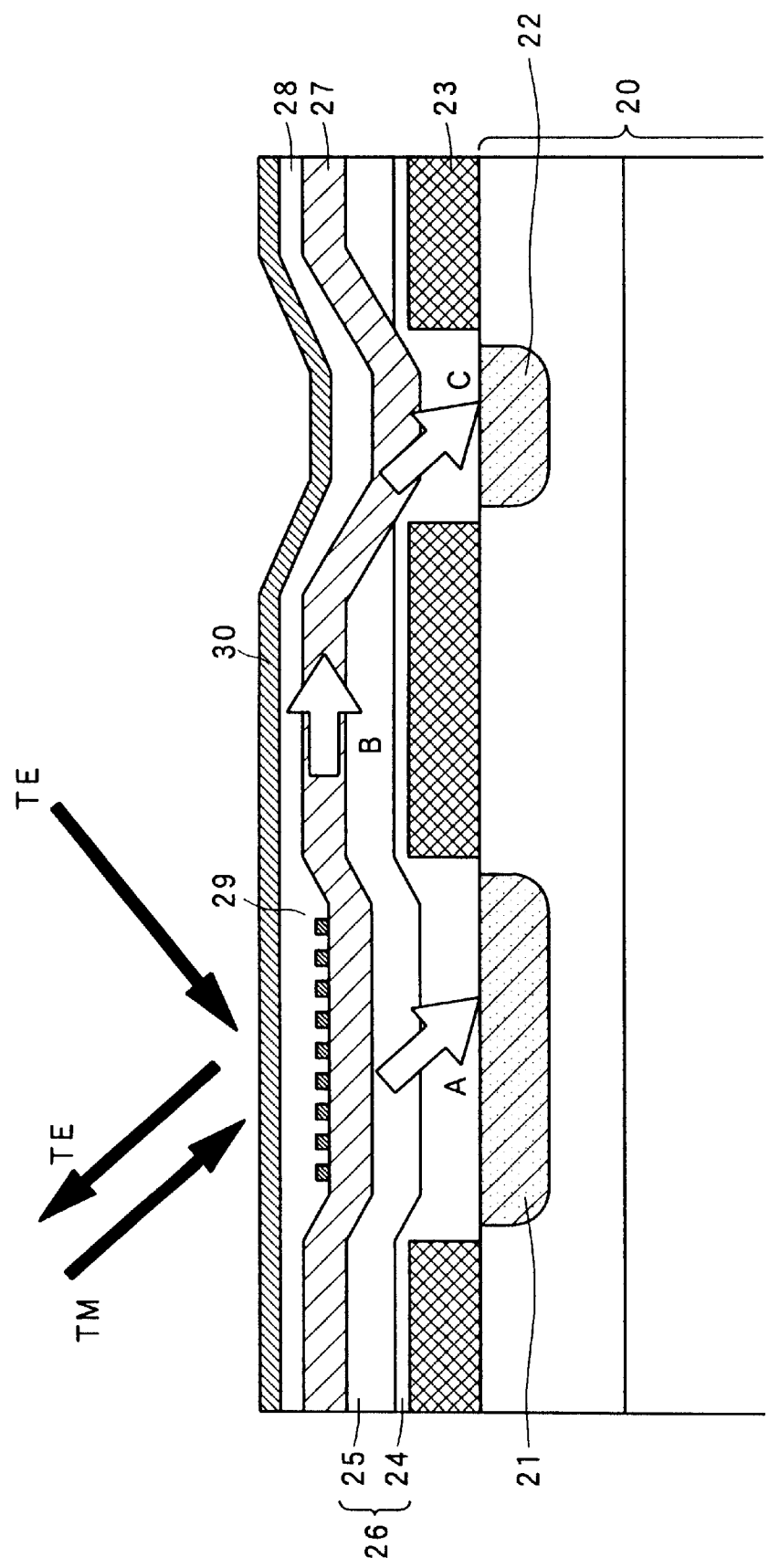
FIG. 7 is a sectional view describing an operation of the optical pickup apparatus in the first embodiment.
Figure 8:
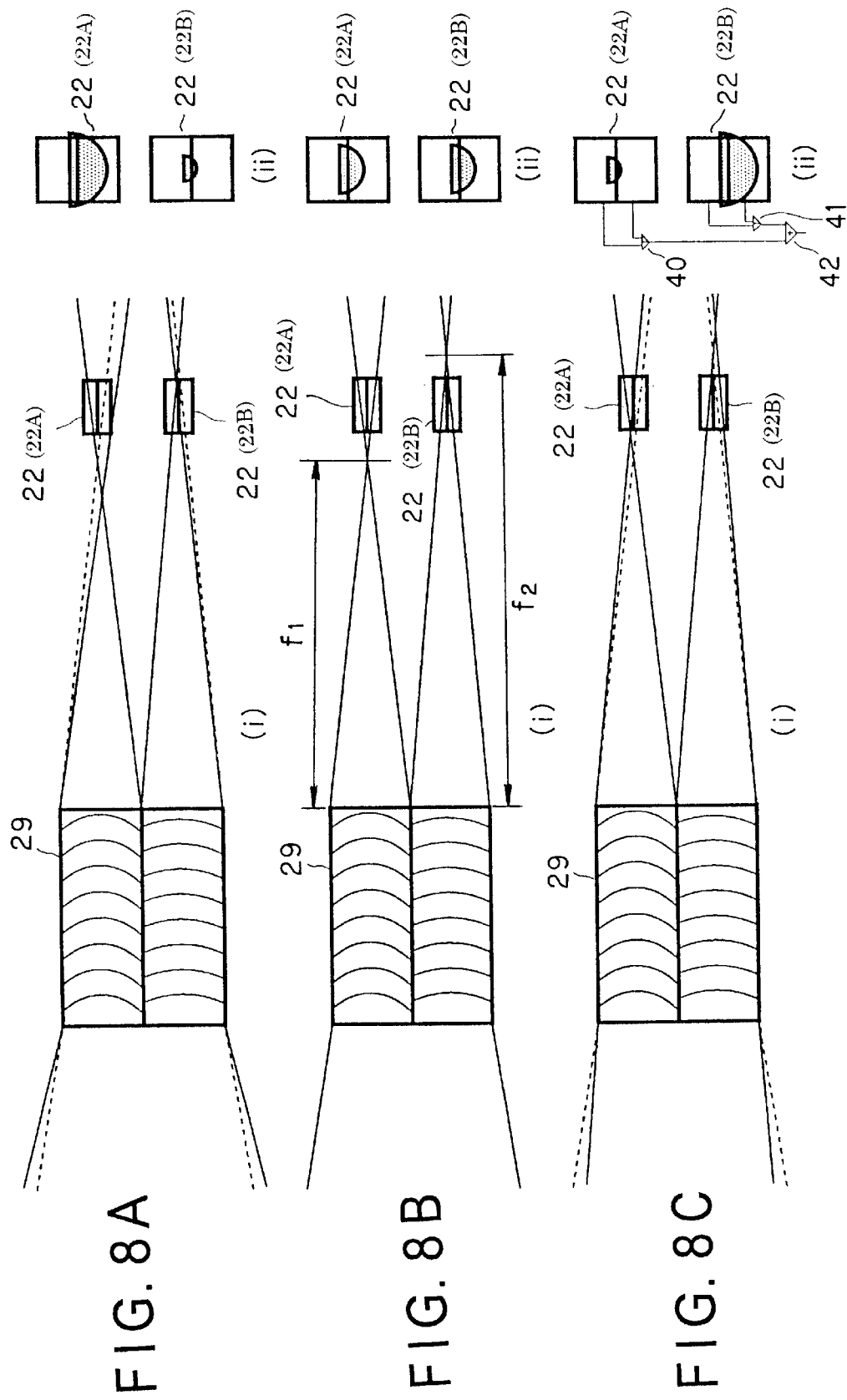
FIG. 8A(i) is one diagram showing the light collection situation of laser lights and the positional relation between a grating and a second light receiving portion 22 when the optical integrated apparatus in the optical pickup apparatus shown in FIG. 6 is seen from above portion in FIG. 6.
FIG. 8B(i) is another diagram showing the light collection situation of laser lights and the positional relation between a grating and a second light receiving portion 22 when the optical integrated apparatus in the optical pickup apparatus shown in FIG. 6 is seen from above portion in FIG. 6.
FIG. 8C(i) is another diagram showing the light collection situation of laser lights and the positional relation between a grating and a second light receiving portion 22 when the optical integrated apparatus in the optical pickup apparatus shown in FIG. 6 is seen from above portion in FIG. 6.

The operation of the above-mentioned optical pickup apparatus 1 in this embodiment will be described below with reference to FIGS. 6 to 8C(ii). FIG. 6 shows the whole configuration of an optical system including a disc using the optical pickup apparatus in the first embodiment. FIG. 7 is a section view similar to FIG. 2. FIGS. 8A(i), 8B(i) and 8C(i) show the light collection situation of laser lights and the positional relation between the grating and the second light receiving portion 22 when the optical integrated apparatus 3 is seen from the above portion in FIG. 6. FIGS. 8A(ii), 8B(ii) and 8C(ii) show the shape of the beam spot on the second light receiving portion 22 corresponding to FIGS. 8A(i), 8B(i) and 8C(i) respectively.

In FIG. 6, at first, the laser light emitted from the semiconductor laser 12 is emitted toward the grating 29 of the optical integrated apparatus 3 at a predetermined angle. The outward and return path separation film 30 is mounted on the top layer of the optical integrated apparatus 3. Thus, only the laser lights at the TE mode are reflected by half mirror effect or polarization beam splitter effect of the outward and return path separation film 30. So, they are irradiated toward a reflection mirror 5 as shown in FIG. 6. Then, those laser lights at the TE mode are reflected by the reflection mirror 5, are made parallel to each other by a collimator lens 6, are inputted through a ¼ wave length plate (not shown) to an objective lens 7, and are then collected onto an information record surface of the optical disc 8 by the objective lens 7.

Next, the return lights reflected on the information record surface of the optical disc 8 are again inputted through the reverse route to the outward and return path separation film 30. The return lights become at the TM mode. Thus, if the outward and return path separation film 30 provided with dielectric multiple-layered film is used, the outward and return path separation film 30 transmits the laser lights at the TM mode. The transmitted laser lights are irradiated to the grating 29, and are separated into the transmitted lights indicated by an arrow A in FIG. 7, and the guided lights indicated by an arrow B in FIG. 7 by a grating coupler provided with the grating 29 and the light guide path 27. Most of the laser lights become the transmitted lights (as indicated by the arrow A), and they are received by the first light receiving portion 21 mounted directly beneath the grating 29 or in the vicinity directly beneath the grating 29. In this embodiment, the first light receiving portion 21 is the quartered light receiving portions. The RF signal is generated on the basis of an output of the first light receiving portion 21. Also, the tracking error signal is generated from the output of the first light receiving portion 21 by using a phase difference method or a push-pull method.

On the other hand, the buffer layer 26 on the second light receiving portion 22 is thinner than the other portions thereof because of the above-mentioned slope. Thus, the guided lights at the guide mode propagated through the light guide path 27 (as indicated by the arrow B) become at the emission mode on the second light receiving portion 22, and are then emitted to the second light receiving portion 22 as shown by an arrow C in FIG. 7. At this time, the radiant lights are collected toward light receiving portions 22A and 22B of the second light receiving portion 22, as shown in FIGS. 8A(i) to 8C(i), due to the light collection effect of the grating coupler. In this embodiment, the left and right patterns of the grating 29 are designed so as to be different from each other, as mentioned above. Actually, even if the laser lights are symmetrically inputted to the left and right sides of the grating 29 as shown in FIG. 8B (i), it is designed that one side has a focal length f1 and has a focal point at the front of the light receiving portion 22A and the other has a focal length f2 and has a focal point at the back of the light receiving portion 22B. Hence, eccentricity of the optical disc 6 and the like cause the focal point of the laser light to be varied on the optical disc 6. If the laser lights are deviated as shown by a dotted line in FIG. 8A (i) or FIG.8C (i), the areas of beam spots in the light receiving portions 22A and 22B are different from each other, as shown in FIG. 8A(ii) or FIG. 8C(ii). The changes in the outputs of the light receiving portions resulting from the changes of the areas are calculated by an operating process of using amplifiers 40 to 42 as shown in FIG. 8C(ii) to then generate the focus error signal. In this way, this embodiment can use a reliable beam size method (Foucault method) to then generate the focus error signal. Also, this embodiment has the configuration in which the propagation mode of the guided lights in the light guide path 27 is changed to the emission mode and then the second light receiving portion 22 detects it. Thus, the light reception amount in the second light receiving portion 22 can be adjusted in accordance with the size (i.e., the coupling length) of the second light receiving portion 22 or the thickness of the buffer layer 26.

In addition, a monitor light receiving portion (not shown) of the semiconductor laser is mounted in the optical pickup apparatus in this embodiment. A power of the semiconductor laser can be monitored in accordance with a signal obtained in the monitor light receiving portion. Then, the power is adjusted at any time. For example, it is enough that the input of the light to the monitor light receiving portion is carried out by reflecting the light from behind a chip on a reflection mirror.

As mentioned above, in this embodiment, the grating coupler is used to separate the return lights from the optical disc 8 into the transmitted lights and the guided lights. Also, the first light receiving portion 21 that is the quartered light receiving portions is mounted directly beneath the grating 29 to which the transmitted lights having the large light quantity are irradiated, or in the vicinity directly beneath it. Thus, in the first light receiving portion 21, the sufficient light quantity can be obtained to excellently generate the RF signal and the tracking error signal. Especially, a very large quantity of lights can be obtained to thereby generate the RF signal in extremely excellent condition, as compared with the conventional case in which a guide path propagation light is used to generate the RF signal as disclosed.in Japanese Patent Application Laid Open No.Sho-63-61430.

Also, the buffer layer 26 on the first light receiving portion 21 is constituted by laminating the $SiO_2$ layer 25 on the SOG layer 24 as well as the SOG layer 24, and further the interval between the light guide path 27 and the first light receiving portion 21 is optimized by the $SiO_2$ layer 25. Thus, the first light receiving portion 21 can be mounted at a position of far field. As a result, it is possible to rarely suffer from the influence of the positional deviation of the semiconductor laser 1.

Also, the slope is provided in the buffer layer 26 around the second light receiving portion 22 to generate the focus error signal. The thickness of the buffer layer 26 on the second light receiving portion 22 is made thinner. The guide mode of the light guide path 27 is changed to the emission mode. The length of the optical path is sufficiently reserved from the grating 29 to the second light receiving portion 22. Then, the beam size method is used to generate the focus error signal. Thus, the change of the focal point of the laser lights on the optical disc 8 can be largely reflected as the increase or decrease of the area of the radiant lights on the second light receiving portion 22, which enables an S/N ratio to be improved over the conventional technique. As for the emission power of the radiant light, the buffer layer 26 below the grating 29 is optimized to thereby make the input coupling coefficient of the light guide path 27 higher. Also, the above-mentioned slope is provided to make the thickness of the buffer layer 26 on the second light receiving portion 22 thinner to thereby increase the emission power. Hence, it is possible to obtain the necessary sufficient light quantity in the second light receiving portion 22.

The light at the emission mode as mentioned above is used for the second light receiving portion 22 to generate the focus error signal. Thus, the light receiving surface of the second light receiving portion 22 can be formed horizontally to an optical axis of the guided lights through the light guide path 27. Also, the first light receiving portion 21 to generate the RF signal and the second light receiving portion 22 to generate the focus error signal can be mounted on the same plane of the semiconductor substrate 20. As a result, the light receiving portions, the light guide path, the grating and the like can be easily laminated on the same substrate by IC process, which enables the optical integrated apparatus itself to be miniaturized.

Especially, the light receiving portion as mentioned above has the configuration similar to that of the typical photo detector or OEIC. Thus, the photo detector or OEIC can be manufactured, and further the optical integrated apparatus can be manufactured only by changing the pattern without changing the process. Hence, it is possible to extremely reduce the manufacturing cost.

Second Embodiment

Figure 9:
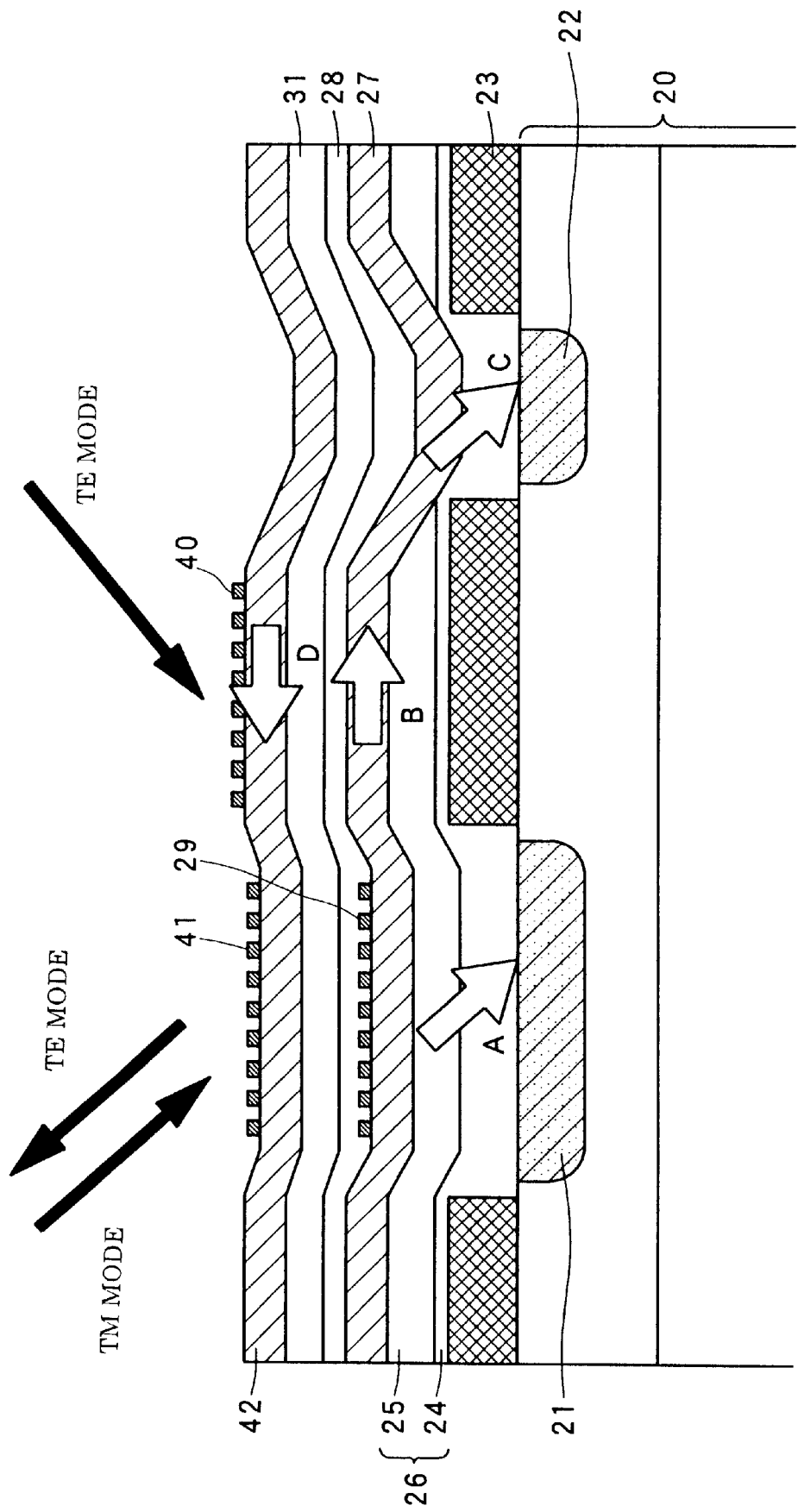
FIG. 9 is a sectional view showing a schematic configuration of an optical integrated apparatus as a second embodiment.
Figure 10:
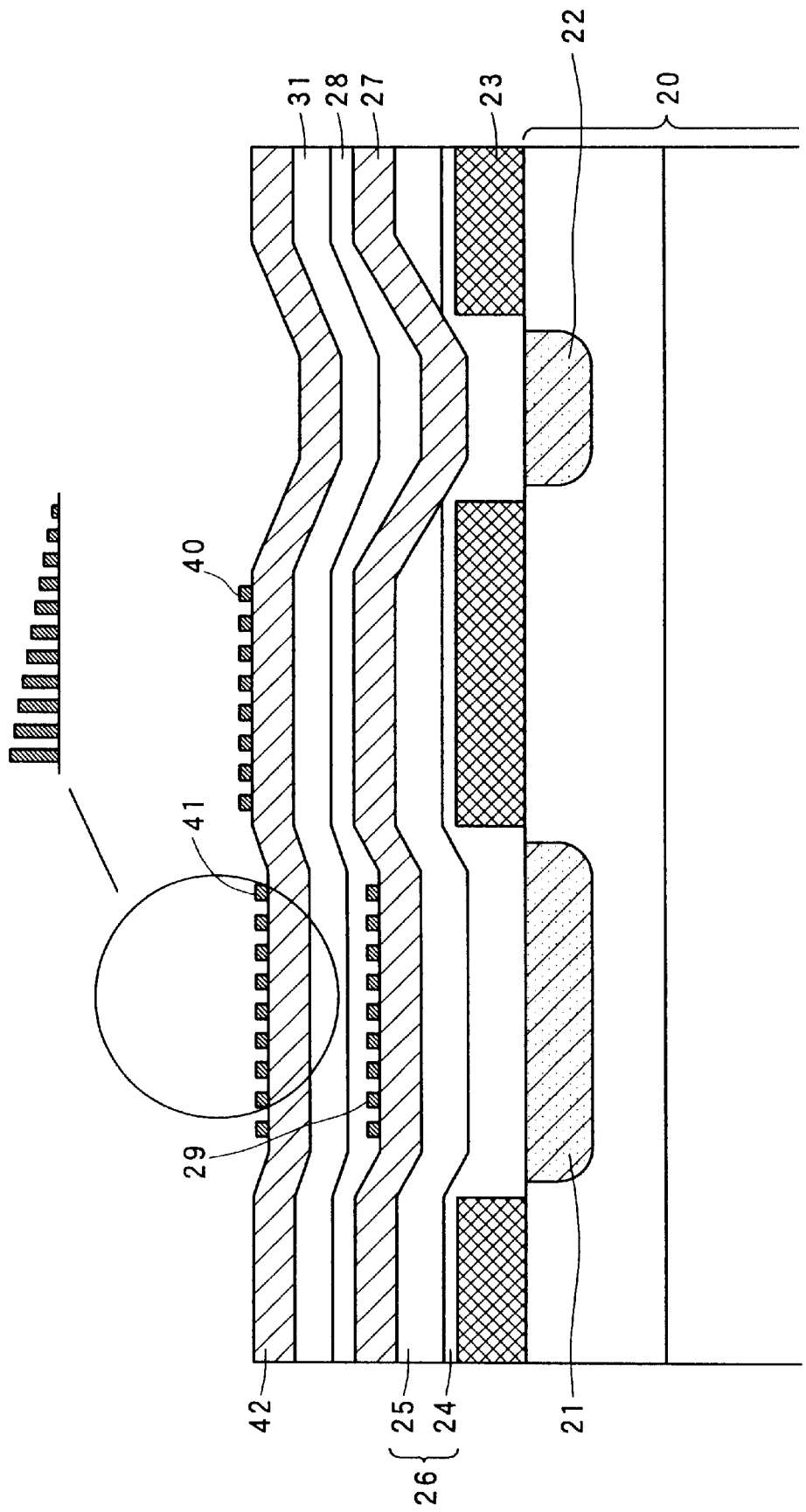
FIG. 10 is a sectional view showing a modified example of a grating in the optical integrated apparatus of FIG. 9.

A second embodiment of the present invention will be described below with reference to FIGS. 9 and 10. In FIGS. 9 and 10, the same constitutional elements as those in the first embodiment carry the same reference numerals, the explanations thereof are omitted.

This embodiment is different from the first embodiment in that a grating coupler provided with gratings 40 and 41 and a light guide path 42 is used as an outward and return path separation device, as shown in FIG. 9, instead of the outward and return path separation film 30 used in the first embodiment. Also, an $SiO_2$ layer 31 for adjusting a distance between the light guide path 42 and a grating 29 is mounted between the light guide path 42 and an SOG layer 28.

The grating 40 serving as a second light wave coupler couples the dispersed lights from the semiconductor laser 12 to the light guide path 42 serving as a second light guide path. It couples the laser lights at the TE mode to the light guide path 42, as an example. The pattern is the pattern of the chirped curve.

The grating 41 serving as a third light wave coupler emits the dispersed lights propagated through the light guide path 42, to outer portion at a predetermined angle. It emits the laser lights at the TE mode, as an example. Also, the grating 41 transmits the input lights from the outer portion. It transmits the laser lights at the TM mode, as an example.

In the above-mentioned configuration, when the laser lights are irradiated from the semiconductor laser 12 to the grating 40, the laser lights at the TE mode are coupled to the light guide path 42 by the grating 40, and propagated within the light guide path 42 in a direction indicated by an arrow D of FIG. 9.

Then, the thus-propagated laser lights at the TE mode are emitted to the outer portion by the grating 41, and are collected onto the information record surface of the optical disc 8 through the reflection mirror 5, the collimator lens 6 and the objective lens 7, as shown in FIG. 6. In addition, even if the grating coupler is used as the outward and return path separation unit, the ¼ wave length plate is required similarly to the first embodiment.

On the other hand, the return lights from the optical disc 8 are inputted through the reverse route to the grating 41. Those return lights becomes at the TM mode. The grating 41 transmits the laser lights at the TM mode. The transmitted laser lights are separated into the transmitted lights and the guided lights by the grating 29, similarly to the first embodiment, and are then received by the first and second light receiving portions 21 and 22, similarly to the first embodiment.

In addition, the output coupling of the grating coupler typically causes a light quantity distribution. Thus, the light quantity distribution can be corrected so as to be closer to a Gauss distribution by changing a height of the grating 41, as shown in FIG. 10. Such a shape can be determined in accordance with a propagation distance and an emission loss coefficient of the grating coupler. It can be produced by a lift-off using a mask sputtering method.

As mentioned above, even if the outward and return path separation device provided with the grating coupler is used instead of the outward and return path separation film provided with the multiple-layered film such as the dielectric and the like, it is possible to carry out the light receiving operation for generating the tracking error signal and the RF signal having the sufficient light quantity and the light receiving operation for generating the focus error signal having the excellent S/N ratio.

As mentioned above, the present invention has been described with reference to the embodiments. However, the present invention is not limited to the above-mentioned embodiments. It is easily contemplated that various modifications and adaptations may be made thereto, without departing from the spirit and scope of the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.Hei.11-18417 filed on Jan. 27, 1999 including the specification, claims, drawings and summary is incorporated herein by reference in its entirety.

What is claimed is:

1. An optical integrated apparatus used in an optical pickup apparatus which irradiates a light emitted by a light emitting device to an optical information record medium, on which record information is recorded, and receives a reflection light reflected from said optical information record medium, said optical integrated apparatus comprising:

a substrate;

a light wave coupler for respectively generating a transmitted light and a guided light out of the reflection light;

a light guide path for propagating the guided light;

a first light receiving portion or receiving the transmitted light;

a second light receiving portion for receiving a radiant light which is generated out of the guided light and is directed toward said substrate due to a phase matching from said light guide path, said light wave coupler, said light guide path, said first light receiving portion and said second light receiving portion being laminated on said substrate, said first light receiving portion and said second light receiving portion being formed in a same layer on said substrate; and a light path separation layer disposed at a top layer of said optical integrated apparatus for separating a light path of a light incident to the top layer into one path for the reflected light to an outside portion of said optical integrated apparatus and another path for the transmitted light to an internal portion of said optical integrated apparatus, said light separation layer comprising:
a second light wave coupler for generating a guided light out of the incident light;
a second light guide path for propagating the guided light generated by said second light wave coupler; and
a third light wave coupler for irradiating the guided light propagated through said second light guide path to the outside portion of said optical integrated apparatus.

2. An optical integrated apparatus used in an optical pickup apparatus which irradiates a light emitted by a light emitting device to an optical information record medium, on which record information is recorded, and receives a reflection light reflected from said optical information record medium, said optical integrated apparatus comprising:

a substrate;

a light wave coupler for respectively generating a transmitted light and a guided light out of the reflection light;

a light guide path for propagating the guided light;

a first light receiving portion for receiving the transmitted light;

a second light receiving portion for receiving a radiant light which is generated out of the guided light and is directed toward said substrate due to a phase matching from said light guide path, said light wave coupler, said light guide path, said first light receiving portion and said second light receiving portion being laminated on said substrate, said first light receiving portion and said second light receiving portion being disposed independently from each other on said substrate, said first light receiving portion generating signals respectively corresponding to the record information and in-plane position information of the emitted light with respect to said optical information record medium, said second light receiving portion generating a signal corresponding to focal point information of the emitted light on said optical information record medium; and a light path separation layer disposed at a top layer of said optical integrated apparatus for separating a light path of a light incident to the top layer into one path for the reflected light to an outside portion of said optical integrated apparatus and another path for the transmitted light to an internal portion of said optical integrated apparatus, said light separation layer comprising:
a second light wave coupler for generating a guided light out of the incident light;
a second light guide path for propagating the guided light generated by said second light wave coupler; and
a third light wave coupler for irradiating the guided light propagated through said second light guide path to the outside portion of said optical integrated apparatus.

3. An optical apparatus for an optical pickup device that irradiates light from a light emitter to an optical information recording medium and receives reflected light from the optical information recording medium, the optical apparatus comprising:

a substrate having a first surface with a first light receiving portion therein for generating a data signal and a second light receiving portion therein for generating a focus error signal;
a buffer layer on said substrate generally parallel to said first surface, said buffer layer being thinner over said second light receiving portion than over said first light receiving portion;
a light guide path on said buffer layer generally parallel to said first surface, said light guide path being sloped adjacent to the thinner part of said buffer layer over said second light receiving portion; and
a light wave coupler for receiving reflected light and directing a majority of the received reflected light toward said first light receiving portion and a minority of the received reflected light through said light guide path where the sloped part of said light guide path causes light in said light guide path to exit said light guide path toward said second light receiving portion.

4. The optical apparatus of claim 3, wherein said second light receiving portion comprises two spaced-apart portions, wherein the focus error signal is generated from a comparison of said two spaced-apart portions.

5. The optical apparatus of claim 3, further comprising a reflecting film over said light wave coupler generally parallel to said first surface, said reflecting film for reflecting light from the light emitter toward the optical information recording medium.

6. An optical apparatus for an optical pickup device that irradiates light from a light emitter to an optical information recording medium and receives reflected light from the optical information recording medium, the optical apparatus comprising:

a substrate having a first surface with a first light receiving portion for generating a signal that is for generating a data signal based on a first majority part of the received reflected light, and a second light receiving portion for generating a signal that is for generating a focus error signal based on a second minority part of the received reflected light;
a light guide path on said substrate generally parallel to said first surface and through which the second minority part of the received reflected light is conveyed to said second light receiving portion, said light guide path having a refractive index higher than material directly adjacent thereto so that the second minority part of the received reflected light is contained within said light guide path;
a return path separation film on said light guide path, said separation film reflecting the light from the light emitter and transmitting the reflected light from the optical information recording medium; and
a light wave grating coupler between said separation film and said light guide path for receiving the reflected light through said separation film and directing the first majority part of the received reflected light toward said first light receiving portion and the second minority part of the received reflected light into said light guide path toward said second light receiving portion.

7. The optical apparatus according to claim 6, wherein said substrate comprises a semiconductor substrate.

8. The optical apparatus according to claim 6, wherein said first light receiving portion is directly beneath said light wave grating coupler.

9. The optical apparatus according to claim 6, further comprising an insulation buffer layer between said second light receiving portion and said light guide path, said buffer layer having an inclined surface to reduce a thickness of said buffer layer adjacent to said second light receiving portion.

* * * * *